(12) United States Patent
Beuermann

(10) Patent No.: US 7,101,418 B2
(45) Date of Patent: Sep. 5, 2006

(54) METHOD AND DEVICE FOR DEGASSING A SUSPENSION, SPECIFICALLY A FIBER STOCK SUSPENSION

(75) Inventor: Karl-Heinz Beuermann, Heidenheim (DE)

(73) Assignee: Voith Paper Patent GmbH, Heidenheim (DE)

( * ) Notice: Subject to any disclaimer, the term of this patent is extended or adjusted under 35 U.S.C. 154(b) by 408 days.

(21) Appl. No.: 10/185,168

(22) Filed: Jun. 28, 2002

(65) Prior Publication Data

US 2003/0015304 A1    Jan. 23, 2003

(30) Foreign Application Priority Data

Jul. 2, 2001    (DE)  .................................. 101 31 982

(51) Int. Cl.
    *B01D 19/00* (2006.01)
    *D21D 5/26* (2006.01)

(52) U.S. Cl. ............................ 95/248; 95/266; 96/170; 96/182; 96/183; 96/190; 96/193; 96/197; 162/264; 162/336; 162/380; 162/381; 210/333.01; 210/345; 210/331; 210/411; 210/456; 210/451; 210/243; 422/186.3

(58) Field of Classification Search ................ 95/248, 95/266; 210/333.01, 345, 346, 411, 451, 210/748, 331, 456, 243; 422/186.3; 96/170, 96/182, 183, 190, 193, 197; 162/264, 336, 162/380, 381
See application file for complete search history.

(56) References Cited

U.S. PATENT DOCUMENTS

| | | | |
|---|---|---|---|
| 3,206,917 A * | 9/1965 | Kaiser et al. .................. 95/248 |
| 3,367,808 A | 2/1968 | Edwards | |
| 3,538,680 A | 11/1970 | Kaiser | |
| 3,720,315 A * | 3/1973 | Kaiser ......................... 209/728 |
| 4,121,090 A * | 10/1978 | Kuenzli ....................... 392/332 |
| 4,219,340 A * | 8/1980 | Kaiser ......................... 95/266 |
| 4,238,206 A * | 12/1980 | Frykhult et al. .............. 96/170 |
| 4,419,109 A * | 12/1983 | Matula ......................... 96/197 |
| 4,581,115 A * | 4/1986 | Holzer .................... 204/278.5 |
| 5,084,161 A * | 1/1992 | Vikio ............................ 209/2 |
| 5,236,475 A * | 8/1993 | Evens ......................... 96/197 |
| 5,268,077 A * | 12/1993 | Bubik et al. ................ 162/380 |
| 5,308,384 A * | 5/1994 | Kapanen et al. .............. 96/260 |
| 5,474,608 A * | 12/1995 | Beisswanger ................ 118/103 |
| 5,514,269 A * | 5/1996 | Day et al. .................... 204/660 |
| 5,616,245 A * | 4/1997 | Albrecht ...................... 210/371 |
| 5,705,068 A * | 1/1998 | Lukkarinen et al. ......... 210/331 |
| 5,868,905 A * | 2/1999 | Graf et al. ................... 162/380 |
| 5,888,388 A * | 3/1999 | Kirk ............................ 210/170 |

(Continued)

FOREIGN PATENT DOCUMENTS

DE          4234522          10/1992

(Continued)

*Primary Examiner*—Duane Smith
*Assistant Examiner*—Minh-Chau T. Pham
(74) *Attorney, Agent, or Firm*—Taylor & Aust, P.C.

(57) ABSTRACT

The invention relates to a method and a device for degassing of suspension, specifically fiber stock suspension. The method according to the invention is characterized in that separated excess suspension is discharged sideways through an overflow having an overflow edge that is located in the tank outside wall and is positioned parallel to the tank axis. The device according to the invention is characterized in that the overflow includes at least one overflow having an overflow edge that is located in the tank outside wall and is positioned parallel to the tank axis and that at least one overflow system, for the purpose of discharging the separated excess suspension, is located following the overflow.

7 Claims, 4 Drawing Sheets

U.S. PATENT DOCUMENTS

| | | | |
|---|---|---|---|
| 6,096,120 A * | 8/2000 | Erlund et al. | 96/182 |
| 6,192,831 B1 * | 2/2001 | Brunse | 119/51.5 |
| 6,193,938 B1 * | 2/2001 | Wedekamp | 422/186.3 |
| 6,352,084 B1 * | 3/2002 | Oshinowo | 134/182 |
| 6,416,632 B1 * | 7/2002 | Kirjasniemi et al. | 162/380 |
| 6,425,986 B1 * | 7/2002 | Gmeiner et al. | 162/380 |

FOREIGN PATENT DOCUMENTS

| | | |
|---|---|---|
| DE | 19946575 | 9/1999 |
| DE | 10117037 | 4/2000 |
| DE | 200 08 711 | 9/2000 |
| WO | WO 97/15717 | 5/1997 |

* cited by examiner

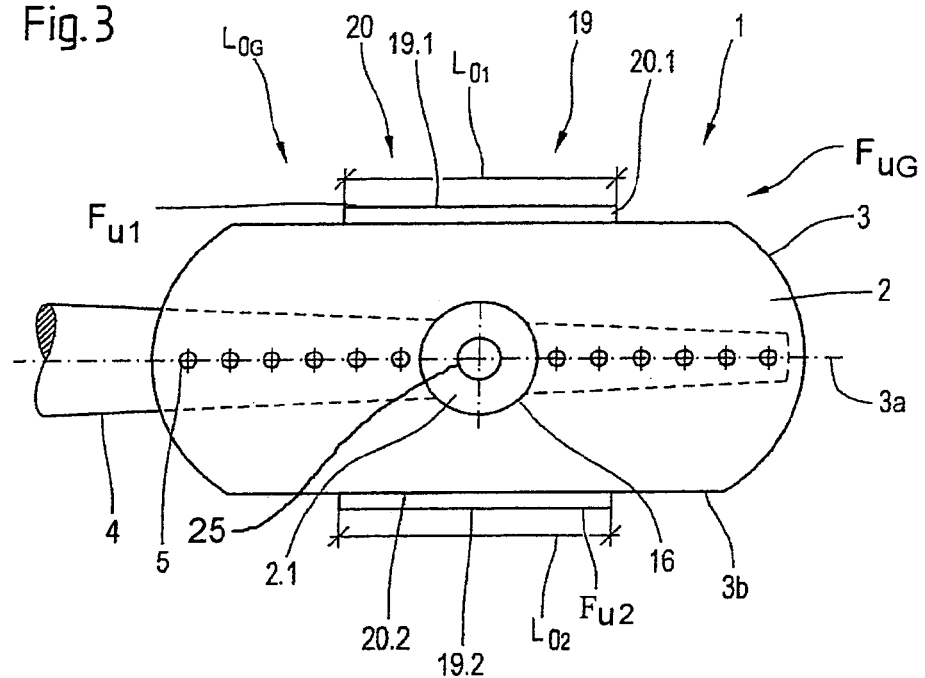
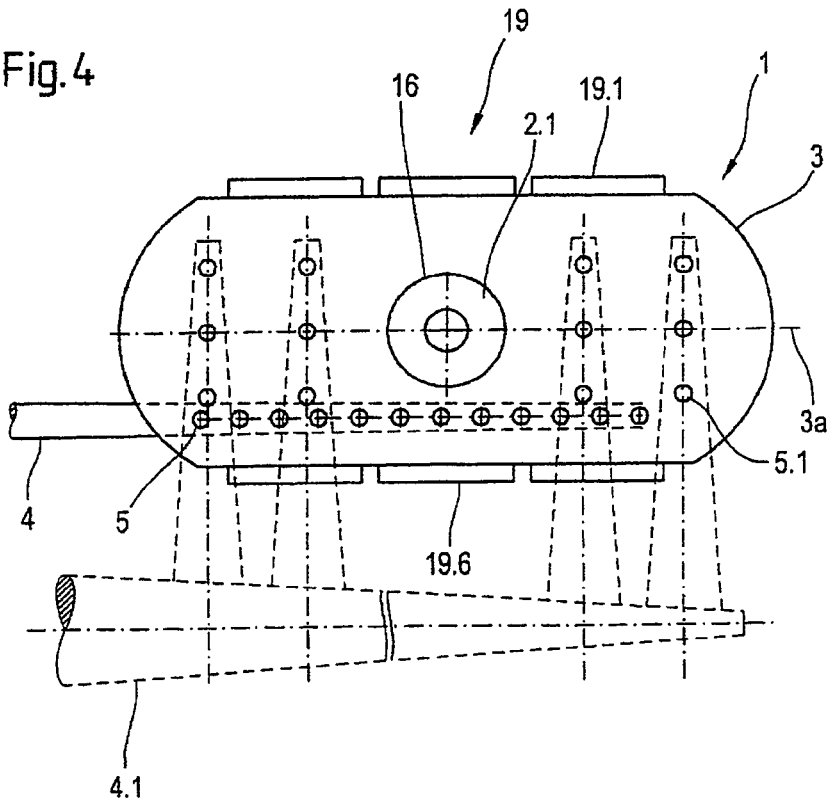

METHOD AND DEVICE FOR DEGASSING A SUSPENSION, SPECIFICALLY A FIBER STOCK SUSPENSION

BACKGROUND OF THE INVENTION

1. Field of the Invention

The invention relates to a device and method for degassing a suspension, and, more particularly, to a method and device for degassing a fiber suspension.

2. Description of the Related Art

In a broad sense the term "suspension" refers to white water containing the essential components of fines and ash, or clarified water containing a minimum of fines and ash content.

Methods and devices for degassing suspensions, specifically fiber stock suspensions that are utilized in paper and cardboard production, are well known to the experts in this field. Consistent with their names, the devices are intended to degas suspensions. During the degassing process other light contaminates, which would otherwise interfere with the paper or cardboard production, are removed by the devices. The devices consist of large tanks into which the suspension that is to be supplied to the paper or cardboard machine, is fed in the form of a thin mixture. The suspension is boiled in a vacuum, thereby separating the gas from the tank into a so-called gas chamber, and discharging minor impurities that are present on the liquid surface in the tank. The suspension that is to be supplied to the paper or cardboard machine is removed through an opening in the tank bottom, located there for the purpose of removing suspension that is as gas free as possible from the tank. In order to maximize the degassing capabilities of the device, a vacuum is generated in the tank by way of a vacuum pump, whereby gas escapes through a line from the tank by way of the vacuum pump. In addition, the degassing capability is improved in that the gas-containing suspension is supplied through steel pipes that are located above the liquid level in the tank. This allows the gas that is present in the added suspension, possibly in the form of bubbles, to be discharged prior to the added suspension coming into contact with the suspension already present.

A single overflow serves to stabilize the liquid level in the tank, whereby a partial stream of approximately 1% to 50% of the total volume of suspension that is supplied to the tank, as well as light contaminants that are present on the liquid surface in the tank, flow over the tank's edge. The separated excess suspension, which includes light contaminants, subsequently flows on to further treatment where every effort is made to discharge them from the suspension and to re-introduce the suspension into the loop.

The German Disclosure Document DE 42 34 522 A1 describes a device for degassing a suspension in a deaeration chamber as used in the paper and pulp industry. The separation wall forms the overflow for the separated, excess suspension that is located essentially level with the rear edge of the outlet for the gas-free suspension, vertical to the tank axis. The overflow for the separated, excess suspension itself slopes toward the overflow in the tank, in opposite direction to the flow direction.

Further disclosures regarding the position and form of the separation wall forming the overflow for the separated, excess suspension may be found in the German prior art publications DE 32 19 749 A1, in the PCT application WO 97/15717 and in the US patent of the Applicant U.S. Pat. No. 5,868,905 (PK10542 US).

All of the aforementioned publications referring to the overflow for the separated excess suspension have the following disadvantage in common. The separation wall is positioned vertically and/or symmetrically to the tank axis (longitudinal axis), its location is a given due to its shape in that it is located on one of the two end areas of the tank, therefore its overflow length is a design given.

The Applicant's non-published German prior art patent application DE 200 08 711.8 (PK11075 DE) also discloses a device for degassing suspensions. An overflow in the form of an overflow pipe having an overflow height and an overflow length is located prior to the at least one outlet opening for the separated excess suspension, as viewed in direction of suspension flow. Even though this device permits flexibility with regard to the position and form of the overflow, it does not however permit fluidic optimum positioning of the overflow.

SUMMARY OF THE INVENTION

It is an objective of the present invention to create a method and a device whereby the overflow for separated excess suspension may be located in a fluidic optimum position between the supply of suspension and the discharge of gas-free suspension, while further improving the hydraulics, and at the same time maintaining low equipment costs.

This objective is met with the present invention, the overflow is located in the outside tank wall, is positioned parallel to the tank axis and has an overflow edge. There is at least one overflow system, for taking away the separated excess suspension, located after the overflow. This design of the overflow provides the opportunity to locate it definitively in a fluidic optimum location, between the supply of suspension and the discharge of gas-free suspension. This arrangement allows further improvement of the hydraulics and lowers equipment costs.

The present invention also teaches that the overflow, which is located in the outside wall of the tank, should be located continuously about the tank. This advantageously provides a uniform discharge of separated excess suspension along the entire circumference of the tank.

In another embodiment of the present invention the overflow is designed in or approximately in the location of the outlet opening, preferably central to the outlet opening of the gas-free suspension in the outside tank wall. This further improves the hydraulics of the device, since the supplied suspension is gas-free in the lower area, and the gas-free excess is discharged in the upper area.

In yet another embodiment of the present invention, the overflow has at least two individual overflows located on both sides of the outside tank wall, with at least one individual overflow edge each. The fluidic symmetry of the discharge of the separated excess suspension creates ideal conditions for improved hydraulics and good system efficiency.

With a view to good system efficiency, combined with lowered equipment costs, it is an advantage if the overflow has an overflow edge having a total overflow edge length in the range of 1 m to 10 m, preferably of 2 m to 7 m, and/or an open total overflow surface in the range of 0.3 $m^2$ to 6 $m^2$, preferably of 0.4 $m^2$ to 5 $m^2$. The overflow surface of the individual overflow has a fluidic optimum outer contour, preferably in the shape of a rectangle, a circle, an oval or a regular or irregular polygon.

If, several overflow surfaces, specifically circles, in the form of individual overflows are located in the tank outside walls, then these are preferably located at equal distances from each other along a center line in the tank outside wall. This arrangement positively supports an improvement in the hydraulics.

The individual overflows discharge individually, in groups or in sections, directly, by way of at least one overflow pipe or by way of at least one overflow chamber in the form of a shell located in the tank outside wall. The discharge continues by way of at least one subsequent overflow pipe, into the overflow system that is located below the tank. This type of supply piping is cost effective and reliable.

A hydraulic stabilizer is located following the outlet opening for the gas-free suspension, as viewed in the direction of flow of the gas-free suspension. This stabilizer, in the form of a dwell tank, has certain fluidic characteristics, offering a buffer capacity for the gas-free suspension, thereby preventing additional creation of pulsations, which are greatly disadvantageous for the subsequent production process in a paper or cardboard machine.

An advantage of the present invention is that the device for producing the vacuum in the tank includes one vacuum connection, one vacuum line and at least one vacuum pump with a line located in the upper interior of the tank. Alternatively several vacuum connections can, at any given time, be operated individually with a separate vacuum line and a separate vacuum pump for each line, or with individual vacuum lines and a common vacuum pump with a line connected thereto.

A further advantageous embodiment of the present invention includes several nozzles located in the upper interior tank area, for moistening the interior surface of the tank that does not come into contact with the suspension. This arrangement positively influences the speed and efficiency of the suspension de-gassing process taking place in the tank. The moistening also prevents fiber, fines or ash deposits.

It is also advantageous, according to the present invention, if the distributor pipe is positioned parallel or approximately parallel to the tank axis. The distributor pipe can be located either outside or inside the tank. This arrangement results in special advantages and technological advantages in the form of distribution uniformity.

In accordance with a method of the present invention the separated excess suspension is discharged sideways through an overflow that is located in the tank outside wall, that is positioned preferably parallel to the tank axis, and having an overflow edge. This provides the opportunity to locate the overflow definitively in a fluidic optimum position between the supply of suspension and discharge of the gas-free suspension, allowing further improvement of the hydraulics, and additionally lowering equipment costs.

It is understood that the aforementioned characteristics of the invention that are subsequently further explained, may be utilized not only in the cited combinations, but also in other combinations, or self-contained, without abandoning the scope of the invention.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein:

FIG. 2b is a front view of the device for degassing a suspension shown in FIG. 2a;

FIG. 3 is a schematic sectional top view of another embodiment of the device for degassing a suspension according to the present invention;

FIG. 4 is yet another schematic sectional top view of another embodiment of the device for degassing a suspension according to the present invention;

Corresponding reference characters indicate corresponding parts throughout the several views. The exemplifications set out herein illustrate one preferred embodiment of the invention, in one form, and such exemplifications are not to be construed as limiting the scope of the invention in any manner.

DETAILED DESCRIPTION OF THE INVENTION

Figure 1:
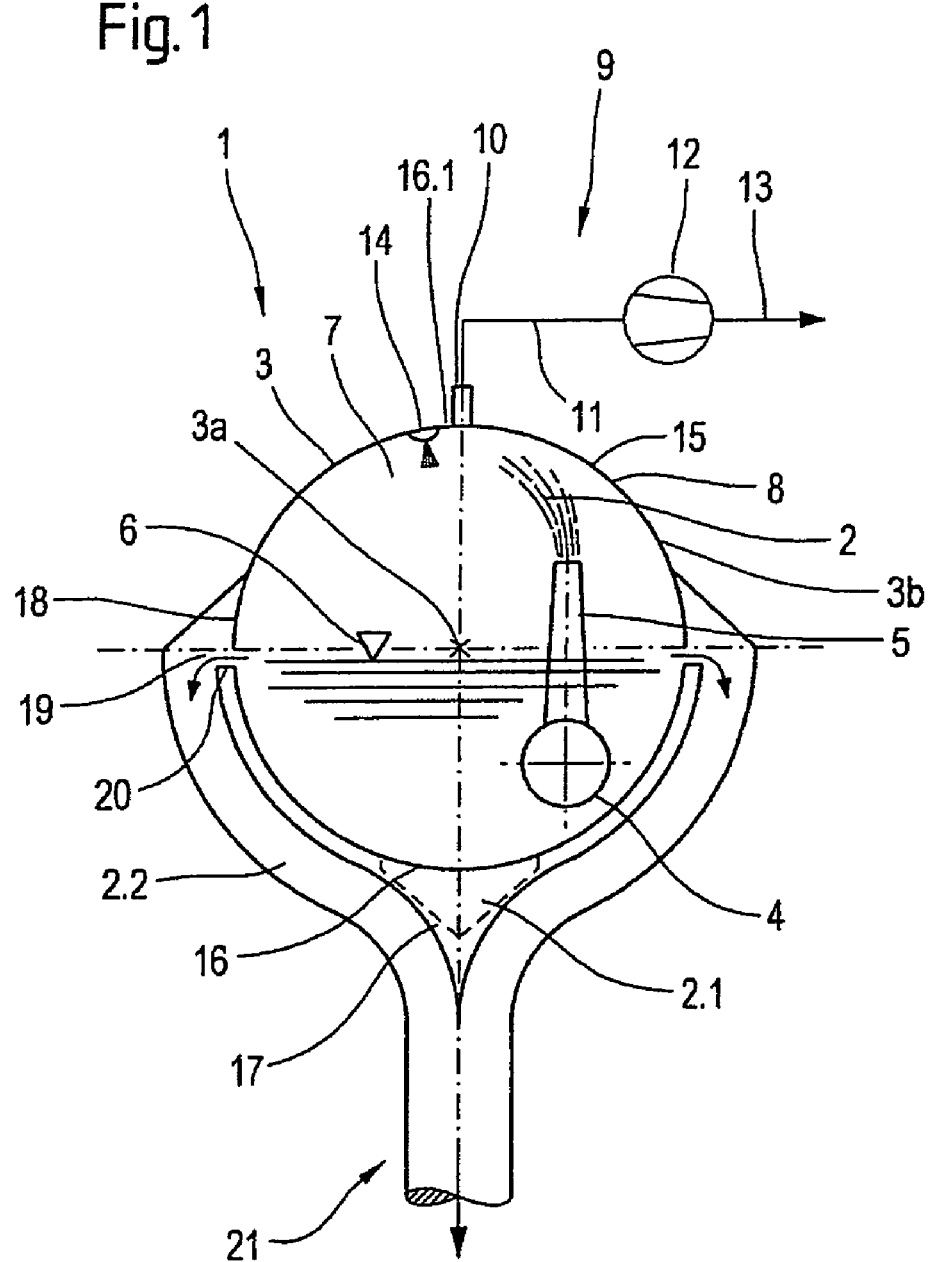
FIG. 1 is a schematic sectional front view, in cross direction to the tank axis, of an embodiment of a device for degassing a suspension, according to the present invention.

Referring now to the drawings, and, more particularly to FIG. 1, there is shown a device 1 for degassing a suspension 2, including horizontally stretched out tank 3 with a tank axis 3a and a tank outside wall 3b. Suspension 2 is fed in the form of a thin mixture through at least one distributor pipe 4 that is positioned parallel to tank axis 3a and from which a multitude of successive jet tubes 5 originate for the purpose of feeding suspension 2 into tank 3. To improve the degassing capabilities of device 1, suspension 2, that at this point still contains gas, is supplied through jet tubes 5 into tank 3, above liquid level 6, whereby gas 7 that may be present in the form of bubbles in suspension 2 is separated before added suspension 2 comes into contact with suspension 2 already present in tank 3. Jet tubes 5 terminate prior to tank ceiling 8, thereby reinforcing the degassing process of suspension 2 since suspension 2 impacts tank ceiling 8.

Figure 2A:
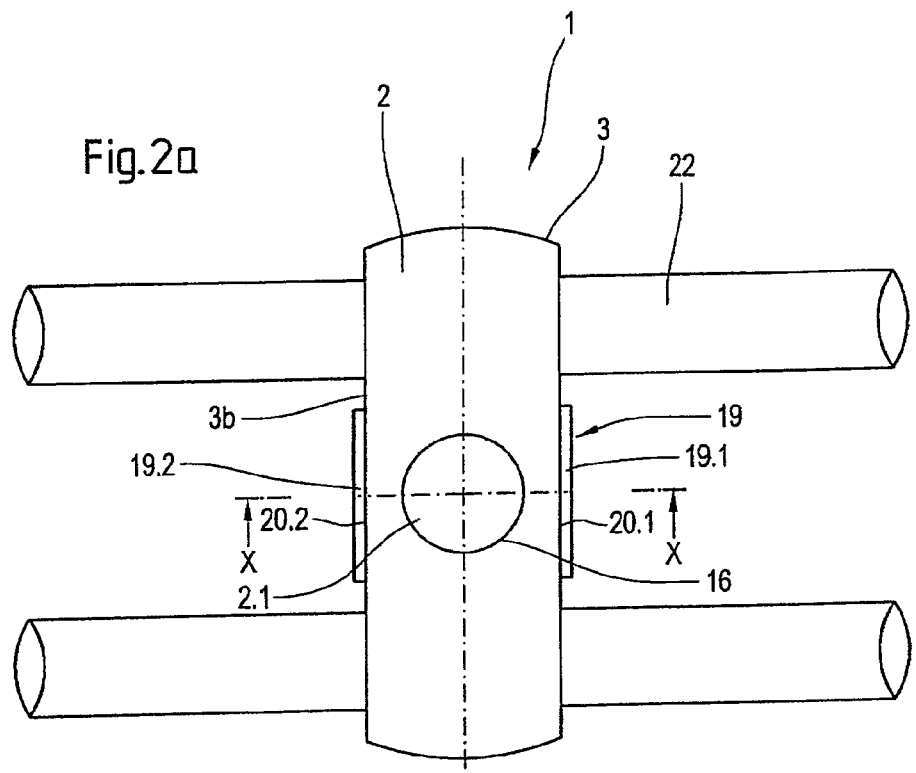
FIG. 2a is a schematic sectional top view of another embodiment of the device for degassing a suspension according to the present invention.
Figure 2B:
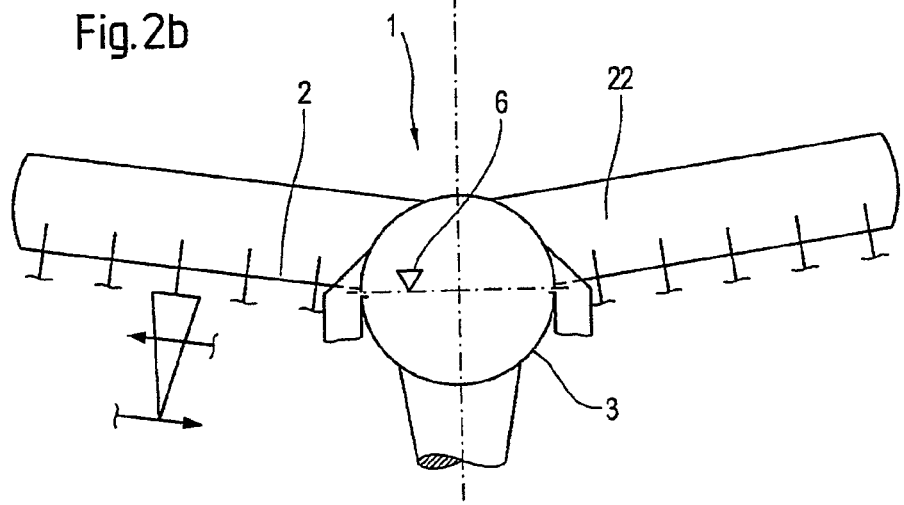

Now, additionally referring to FIGS. 2a and 2b, the supply of suspension 2 can also occur through a chamber system. Near the interior top area of tank ceiling 8 vacuum device 9 includes a vacuum connection 10 with a vacuum line 11 located at outlet opening 16.1 that in turn is connected to vacuum pump 12 having a continuing line 13. Vacuum connection 10 may alternatively be located in a side area of tank ceiling 8. By connecting tank 3 to vacuum pump 12 the degassing capability of device 1 is maximized, whereby separated gas 7 is pumped from tank 3 by vacuum pump 12. In the area of tank ceiling 8 that is facing away from jet tubes 5 several nozzles 14 are provided for the purpose of moistening interior tank surface 15 that is not in contact with suspension 2. This measure positively influences the speed and efficiency of the degassing process occurring in tank 3. An outlet opening at 16 flows into piping system 17 intended for the discharging of gas-free suspension 2.1. An outlet opening at 18 is for the discharge of excess suspension 2.2 by way of overflow 19 in the area of tank 3 that is facing away from distributor pipe 4.

In accordance with one embodiment of the present invention device 1 is characterized by overflow 19 being at least one overflow 19 having overflow edge 20 and located along tank outside wall 3b, progressing parallel to tank axis 3a. At least one overflow system 21, for the purpose of taking away the discharged excess suspension 2.2, is located following overflow 19.

In another embodiment of the present invention, a hydraulic stabilizer 25 is located after outlet opening 16 for gas-free suspension 2.1, viewed in the direction of flow of gas-free suspension 2.1. Such a hydraulic stabilizer is disclosed in the German prior art disclosure document DE 199 46 575 A1 (PK10979 DE). The content of this disclosure document hereby becomes part of the present description; we will refrain from a further detailed description of hydraulic stabilizer 25.

Yet another embodiment of the present invention for the degassing of a suspension is illustrated in FIG. 2. Some of the component parts and component groups of tank 3 are disclosed in U.S. Pat. No. 3,538,680 (DE-A 17 61 496). The content of this cited U.S. prior art document becomes herewith an object of this description. The supply of suspension 2 into tank 3 occurs by way of four chambers 22 that communicate with and supply suspension 2 to tank 3. Communicating chambers 22 are located essentially above liquid level 6 of supplied suspension 2 in tank 3.

Overflow 19 is located in the area or approximately in the area of outlet opening 16 for the flow of gas-free suspension 2.1, in tank outside wall 3b. As indicated in FIG. 2a, overflow 19 is ideally centrally located with outlet opening 16 for gas-free suspension 2.1 in tank outside wall 3b. Further provisions are made so that overflow 19 is configured in the form of at least two individual overflows 19.1 and 19.2 in both sides of tank outside wall 3b with at least one individual overflow edge 20.1 and 20.2 respectively.

FIG. 2b provides a front view of device 1 according to the invention illustrated in FIG. 2a (sectional X—X), where it is shown that communicating chambers 22 are located essentially above liquid level 6 of supplied suspension 2 in tank 3.

Figure 5:
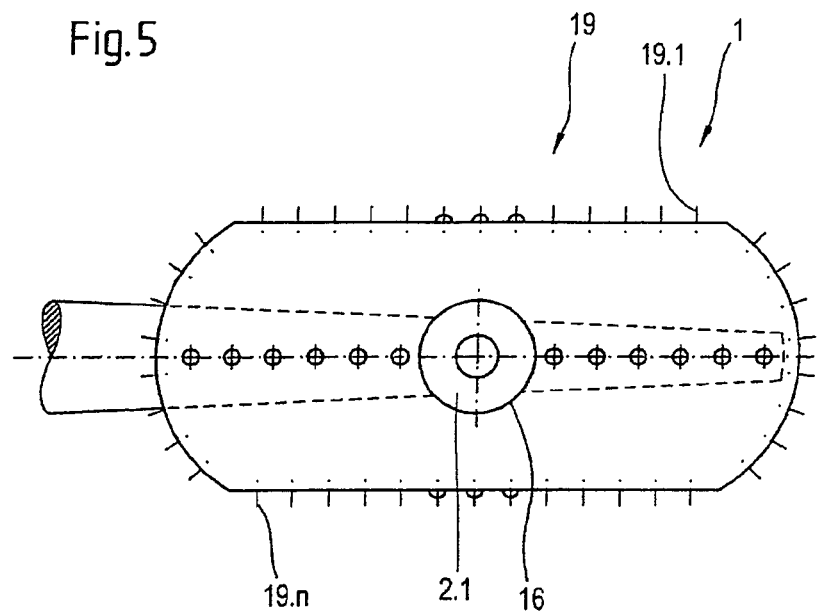
FIG. 5 is still another schematic sectional top view of another embodiment of the device for degassing a suspension according to the present invention.

Now, additionally referring to FIGS. 3–5, there is illustrated three schematic sectional top views of three additional embodiments of device 1 according to the present invention. FIG. 3 shows device 1 having overflow 19, including two individual overflows 19.1 and 19.2 located in tank outside wall 3b, and centrally positioned with outlet opening 16 for gas-free suspension 2.1. Overflow 19 includes an overflow edge 20 having two individual overflow edges 20.1 and 20.2 with a total overflow edge length $L_{\ddot{U}G}$ (sum total of the individual overflow edge lengths $L_{\ddot{U}1}$ and $L_{\ddot{U}2}$) in the range of 1 m to 10 m, preferably of 2 m to 7 m, and an open total overflow surface $F_{\ddot{U}G}$ (sum total of the individual overflow surfaces $F_{\ddot{U}1}$ and $F_{\ddot{U}2}$) in the range of 0.3 m$^2$ to 6 m$^2$, preferably of 0.4 m$^2$ to 5 m$^2$.

Distributor pipe 4 from which a multitude of successive jet tubes 5 originate, for the purpose of supplying suspension 2 into tank 3, is located parallel or approximately parallel to tank axis 3a and is located outside tank 3 and in the present example below tank 3.

Now, additionally, referring to FIG. 4 there is shown device 1 with overflow 19 that includes individual overflows 19.1 through 19.6, located on both sides of tank outside wall 3b of tank 3, and centrally positioned with outlet opening 16 for gas-free suspension 2.1.

Distributor pipe 4, from which a multitude of successive jet tubes 5 originate for the purpose of supplying suspension 2 to tank 3, is positioned parallel or approximately parallel to tank axis 3a and is located inside tank 3. At least one distributor pipe 4.1 progresses parallel to tank axis 3a and thereby progresses in an angled manner in or under tank 3. Jet tubes 5.1 run into tank 3 from angled distributor pipe 4.1. This design is illustrated in FIG. 4 with broken lines. If tank 3 has the three-dimensional form of a ball, or at least a shell with a sealing surface then jet tubes 5.1 would be placed in a circular configuration from the at least one distributor pipe.

Now, additionally referring to FIG. 5 there is shown device 1 with overflow 19 that includes a multitude of individual overflows 19.1 through 19.n that are centrally located with outlet opening 16 for gas-free suspension 2.1. In expanding the object of the invention further it is also possible that overflow 19 be located in the outside tank wall essentially continuously on the tank, as indicated in the drawing by the lines around the outside area. It should be noted that the location of the individual overflows does not necessarily have to be centered with the outlet opening 16 for gas-free suspension 2.1, however a centered location results in hydraulic advantages.

Figure 6:
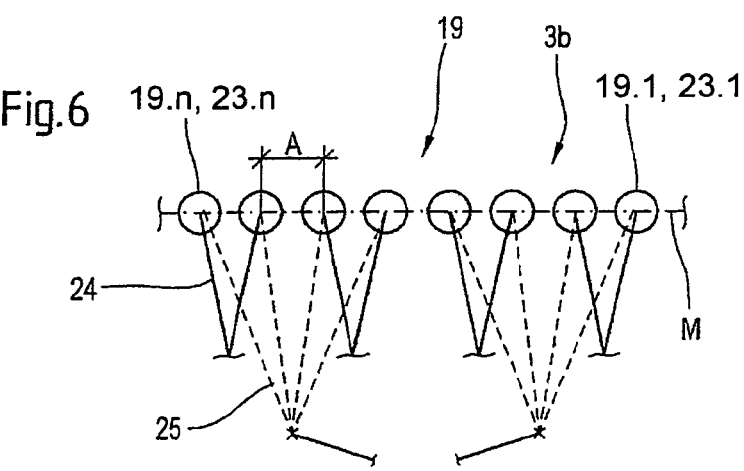
FIG. 6 is a view of individual overflows of the device for degassing a suspension as shown in FIG. 5.
Figure 7:
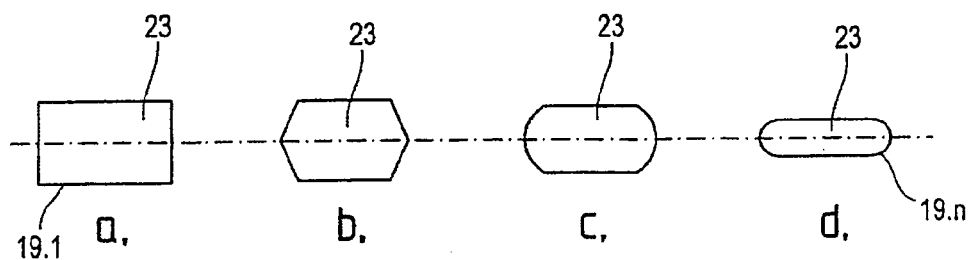
FIG. 7a is a view of a form of an overflow of the device for degassing a suspension according to the present invention.
FIG. 7b is another form of an overflow of the device for degassing a suspension according to the present invention.
FIG. 7c is yet another form of an overflow of the device for degassing a suspension according to the present invention.
FIG. 7d is still another form of an overflow of the device for degassing a suspension according to the present invention.

Now, additionally referring to FIG. 6 there is shown individual overflows 19.1 through 19.n as illustrated in FIG. 5. Overflow 19 consists of several individual overflows 19.1 through 19.n that offer preferred overflow surfaces 23.1 through 23.n. Preferred overflow surfaces 23.1 through 23.n are circles in FIG. 6, which are configured at uniform distance A along center line M in tank outside wall 3b.

Individual overflows 19.1 through 19.n flow individually or in groups 24 or in sections 25 directly by way of at least one overflow pipe or by way of at least one overflow chamber in the form of a half-shell located in tank outside wall 3b and at least one downstream overflow pipe into the overflow system that is located below tank 3.

Now, additionally referring to the FIGS. 7a through 7d there are shown various forms of overflow surfaces 23 according to the present invention. Overflow surface 23 of individual overflow 19.1 through 19.n is in the form of a rectangle, a circle, an oval or a regular or irregular polygon.

The device in accordance with the invention for degassing of suspensions, specifically fiber stock suspension is ideally suited to implement the method in accordance with the invention for degassing of suspensions, specifically fiber stock suspensions.

In summarizing, it is to be noted that the present invention creates a method and a device of the type described at the beginning, whereby the overflow for the discharged excess suspension can be located in fluidic optimum located and form between the supply of the suspension and discharge of gas-free suspension, while permitting further improvement of the hydraulics and with the additional benefit of lower equipment costs.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

| Component identification index | |
|---|---|
| 1 | Device (for degassing of suspensions) |
| 2 | Suspension |
| 2.1 | Gas-free suspension |
| 2.2 | Separated, excessive suspension |
| 3 | Tank |
| 3a | Tank axis |
| 3b | Tank outside wall |
| 4, 4.1 | Distributor pipe |
| 5, 5.1 | Jet tube |
| 6 | Liquid level |
| 7 | Gas |
| 8 | Tank ceiling |
| 9 | Vacuum Device |
| 10 | Vacuum connection |
| 11 | Vacuum line |
| 12 | Vacuum pump |
| 13 | Line |
| 14 | Nozzle |
| 15 | Tank interior surface |
| 16, 16.1, 18 | Outlet opening |
| 17 | Piping system |
| 19 | Overflow |
| 19.1 through 19.n | Individual overflow |
| 20 | Overflow edge |
| 20.1, 20.2 | Individual overflow edge |
| 21 | Overflow system |
| 22 | Chamber |
| 23, 23.1 through 23.n | Overflow surface |
| A | Distance (separation) |
| $F_{ÜG}$ | Total overflow surface |
| $F_{Ü1}$ and $F_{Ü2}$ | Individual overflow surface |
| $L_{Ü1}$ and $L_{Ü2}$ | Individual overflow edge length |
| $L_{ÜG}$ | Total overflow edge length |
| M | Center line |
| X—X | Section |

What is claimed is:

1. A device for the degassing of fiber suspensions, comprising:
   a tank having a substantially horizontal tank axis, said tank including an outer wall;
   at least one gas free suspension outlet centrally located on said tank;
   at least one gas outlet located on said tank;
   at least one separated excess suspension outlet including at least one overflow, at least one said overflow having an overflow edge located in said outer wall, said overflow edge being substantially parallel to said tank axis, the sum of the lengths of each said overflow edge being in the range of approximately 1 m to approximately 10 m;
   a vacuum device attached to said tank; and
   at least one overflow system following said overflow.

2. The device of claim 1, wherein said sum of the lengths of each said overflow edge is in the range of approximately 2 m to approximately 7 m.

3. A device for the degassing of fiber suspensions, comprising:
   a tank having a substantially horizontal tank axis, said tank including an outer wall;
   at least one gas free suspension outlet centrally located on said tank;
   at least one gas outlet located on said tank;
   at least one separated excess suspension outlet including at least one overflow, at least one said overflow having an overflow edge located in said outer wall, said overflow edge being substantially parallel to said tank axis, each said overflow having an open overflow surface, the sum of each said open overflow surface being in the range of approximately 0.3 $m^2$ to approximately 6 $m^2$;
   a vacuum device attached to said tank; and
   at least one overflow system following said overflow.

4. The device of claim 3, wherein said sum of each said open overflow surface is in the range of approximately 0.4 m2 to approximately 5 m2.

5. A device for the degassing of fiber suspensions, comprising:
   a tank having a substantially horizontal tank axis, said tank including an outer wall;
   at least one gas free suspension outlet centrally located on said tank;
   at least one gas outlet located on said tank;
   at least one separated excess suspension outlet including at least one overflow, at least one said overflow having an overflow edge located in said outer wall, said overflow edge being substantially parallel to said tank axis, said at least one overflow being a plurality of overflows, each said overflow having an open overflow surface, each said overflow surface having the shape of one of a rectangle, a circle, an oval, a regular polygon and an irregular polygon;
   a vacuum device attached to said tank; and
   at least one overflow system following said overflow.

6. The device of claim 5, wherein each said overflow surface has the shape of a circle, each said overflow being disposed proximate a center line along said outer wall, said overflows being separated by substantially equal distances.

7. The device of claim 5, further comprising an overflow system located below said tank, said overflows discharge one of individually, in groups and in sections by way of one of at least one overflow pipe and at least one overflow chamber into said overflow system.

* * * * *

UNITED STATES PATENT AND TRADEMARK OFFICE
CERTIFICATE OF CORRECTION

| | | |
|---|---|---|
| PATENT NO. | : 7,101,418 B2 | Page 1 of 1 |
| APPLICATION NO. | : 10/185168 | |
| DATED | : September 5, 2006 | |
| INVENTOR(S) | : Beuermann | |

It is certified that error appears in the above-identified patent and that said Letters Patent is hereby corrected as shown below:

TITLE PAGE
    In the second column in the patent list, please delete "4,238,206", and substitute therefore --4,238,208--.

Signed and Sealed this

Tenth Day of July, 2007

JON W. DUDAS
*Director of the United States Patent and Trademark Office*